(12) United States Patent
Farmer

(10) Patent No.: US 7,374,180 B2
(45) Date of Patent: May 20, 2008

(54) SNOWBOARD SCOOTER

(76) Inventor: Tim Farmer, 2537 Olive Ave., La Crescenta, CA (US) 91214

( * ) Notice: Subject to any disclaimer, the term of this patent is extended or adjusted under 35 U.S.C. 154(b) by 933 days.

(21) Appl. No.: 10/460,126

(22) Filed: Jun. 11, 2003

(65) Prior Publication Data

US 2004/0007838 A1   Jan. 15, 2004

Related U.S. Application Data

(60) Provisional application No. 60/388,468, filed on Jun. 12, 2002.

(51) Int. Cl.
A63C 7/00 (2006.01)

(52) U.S. Cl. ............... 280/14.27; 280/14.22; 280/21.1; 280/28.11

(58) Field of Classification Search ............ 280/14.27, 280/845, 12.1, 12.12, 14.21, 14.22, 14.28, 280/21.1, 28.11; D12/8, 9; D21/760–767
See application file for complete search history.

(56) References Cited

U.S. PATENT DOCUMENTS

| | | | | |
|---|---|---|---|---|
| 3,529,847 A * | 9/1970 | Shores | ............... | 280/14.22 |
| 4,152,007 A * | 5/1979 | Smith | ............... | 280/605 |
| 4,708,353 A * | 11/1987 | Evequoz | ............... | 280/16 |
| 4,773,659 A * | 9/1988 | Rygiel | ............... | 280/142 |
| 4,915,400 A * | 4/1990 | Chambers | ............... | 280/14.27 |
| 5,096,217 A * | 3/1992 | Hunter | ............... | 280/607 |
| 5,516,126 A * | 5/1996 | Myers | ............... | 280/14.28 |
| 5,931,481 A * | 8/1999 | Hoffman | ............... | 280/28.11 |
| 6,000,711 A * | 12/1999 | Fey et al. | ............... | 280/603 |
| 6,139,031 A * | 10/2000 | Wingard | ............... | 280/14.28 |
| D451,162 S * | 11/2001 | Spiers | ............... | D21/767 |
| D466,833 S * | 12/2002 | Pan | ............... | D12/8 |
| 6,502,675 B1 * | 1/2003 | Andrus | ............... | 188/344 |
| 6,575,479 B2 * | 6/2003 | Combs | ............... | 280/21.1 |
| 6,652,422 B1 * | 11/2003 | Day | ............... | 482/51 |

* cited by examiner

Primary Examiner—Christopher Ellis
Assistant Examiner—Brian Swenson
(74) Attorney, Agent, or Firm—Berliner & Associates

(57) ABSTRACT

A snowboard scooter formed of a one-piece platform wide enough to accommodate the width of two feet, with side-by-side but offset foot grips in the form of straps, as on a snowboard, requiring the user to place his or her feet in predetermined positions, a fixable post and a handlebar, and a brake system actuated either at the handlebar or by direct contact with one of the user's feet. Preferably a hydraulic brake system is used to drive a rear flange into the snow to stop the snowboard.

23 Claims, 6 Drawing Sheets

SNOWBOARD SCOOTER

CROSS-REFERENCE TO RELATED APPLICATIONS

This application claims the benefit of Provisional Patent Application No. 60/388,468, filed Jun. 12, 2002.

FIELD OF THE INVENTION

The field of the invention comprises snowboards and scooters.

BACKGROUND OF THE INVENTION

Downhill skiing is a popular sport in which there have been a number of important developments bringing greater excitement, fun, and safety. Untethered, spring-loaded brakes, improved materials, and innovative ski designs, such as parabolic skis, have enabled all skill levels to enjoy the sport. Snowboarding has brought increased excitement to downhill skiing, but has generally been limited to those with greater athletic ability and flexibility. Safety can be easily compromised, not only for the snowboarders, but for skiers in the area endangered by out-of-control snowboarders. Over many decades, a wide variety of devices have been suggested to "improve" the skiing experience or to make it safer or easier for those without athletic ability or acquired skills. Many of these devices have taken the form of a scooter, for example, in Shores U.S. Pat. No. 3,529,847, where a mono-ski is fitted with a handlebar carried on a post connected to a single ski wherein the skier places his feet aligned one in back of the other. The post can be vertically tilted by a control on the handlebar. "Brakes" are spring loaded to maintain the post in a chosen rotational position and can be released to change the rotational position by means of a cable connected a lever pivotally attached to the handlebar. Little U.S. Pat. No. 4,606,548 discloses a device having a handlebar carried on a bendable mechanism connected to a single ski. Brumbt U.S. Design Pat. No. Des. 257,336 provides a handlebar rigidly secured at an angle to a board which itself is supported on a pair of runners. Moerling U.S. Pat. No. 2,292,891 provides a snow scooter having a platform placed on top of the rear of a relatively narrow single runner. A brake is arranged at the forward end of the platform to extend into the snow against the force of a biasing spring. Monreal U.S. Pat. No. 4,744,584 secures upright post-handles to each of two otherwise standard and independent skis. Benson U.S. Pat. No. 4,129,313 discloses what appears to be a water ski board provided with vertically tiltable posts carrying a handlebar.

Many previously proposed devices use handlebars on a post to enable the user to steer without the need for body movement. Wingard U.S. Pat. No. 6,139,031 attaches a rudder through the forward part of a snowboard, connected to an upright handle and grip, to steer and/or brake the board. Myers U.S. Pat. No. 5,516,126 provides a handlebar secured by means of a tiltable post to a snow runner; see also, Spiers U.S. Pat. No. D451,162. Steering blades extend into the snow on respective sides of the runner operated by respective boot pads. A brake located toward the rear of the runner can be pushed vertically straight into the snow against the force of a biasing spring. Brown U.S. Pat. No. 2,593,974 provides a forward steering and braking blade mounted between the front ends of two skis and controlled by a handlebar connected to the blade by a post. Additional braking is provided by U-shaped flanges connected to the rear of shoe pads and which can be tilted into engagement with the snow on respective outer sides of the skis.

Other devices bifurcate the runner into a forward steering part and a rear platform on which the user stands. Upright posts with handlebars or gripping surfaces are provided to enable the user to steer the device. Examples can be found in Burger U.S. Pat. No. D460,137, Lanner U.S. Pat. No. D384,912, Blomstrand U.S. Pat. No. 1,723,966, Kupka U.S. Pat. No. 4,160,552, Evequoz U.S. Pat. No. 4,708,353, Rygiel U.S. Pat. No. 4,773,659, Ohlhaver U.S. Pat. No. 2,513,199, Petoud U.S. Pat. No. 5,351,975, Hylan U.S. Pat. No. 2,256,203, and Wetzel U.S. Pat. No. 1,945,170. Some combine runner bifurcation with brakes, such as Van Daam U.S. Pat. No. 1,524,850 which has a downwardly tiltable brake separating forward and rear runners, and Anderson et al U.S. Pat. No. 2,101,229, which has a downwardly tiltable brake on one side of a rearward portion of the rear runner. The most recent implementation can be found in McClure et al U.S. Pat. No. D467,199 and in McClure et al U.S. Patent Application Publication No. 2003/0067127.

As can be seen from the above listed references, some ski scooters are formed with a single runner, others with two or more runners, some of the latter using a front runner to steer and a back runner to stand on, while others use parallel runners. The above patents divide themselves into still other categories. Some of them are meant to support only one foot, while the other foot is used to propel the device, much in the manner of a simple land scooter, such as described in the above U.S. Pat. Nos. 1,524,850, 1,723,966, 1,945,170, 2,101,229, and 4,160,552. Others provide boot grips to place the feet placed one after the other as in U.S. Pat. Nos. 3,529,847, and 4,773,659. Still others provide separate but parallel runners, each with a boot grip to place the feet side by side on the separate runners as in U.S. Pat. Nos. 2,593,974, 4,708,353, and 4,744,584, or provide parallel, side-by-side, non-offset, non-slip surfaces as in U.S. Pat. No. 5,516,126. The remaining references do not provide any means for locating the feet at particular positions.

None of the foregoing devices and proposed designs are believed to provide the user with a full skiing experience. With both skis and snowboards, a great part of the enjoyment comes from the movement or tilting of one's body to control direction and speed, providing so called "body English", yet the purpose of many of the above-described devices is, essentially, to remove or compromise the need for such body English. Other devices attempt to provide safety by braking mechanisms that are awkward to use or which require unnecessary coordination to operate satisfactorily. A need exists for a device that will allow a user to experience the exhilaration and enjoyment of snowboarding without loss of control, without the need for great athleticism, yet retaining the feel that comes from the use of body English to turn and to check speed, while enabling the user to quickly stop in a safe, easy manner.

SUMMARY OF THE INVENTION

The present invention satisfies the foregoing needs by providing a scooter like snowboard that enables a user to experience snowboarding without requiring great athleticism and with a significant level of safety. This is accomplished by providing a one-piece platform wide enough to accommodate the width of two feet, with laterally dispose but offset foot grips in the form of straps, as on a snowboard, requiring the user to place his or her feet in predetermined positions, fitting the one-piece platform with a fixable upright post and a handlebar, and providing a brake system actuated either at the handlebar or by direct contact with one of the user's feet. More particularly, a rear brake is provided located on the longitudinal axis of the board so as to better enable the user to maintain control when slowing or stopping the scooter. The brake is located on the rear edge of the scooter for optimal control. While it can be operated by a rear foot pedal, it is preferably operated at the handlebar. In one embodiment, a cable is connected from the handlebar to the rear foot pedal. In a preferred embodiment, a hydraulic brake system is used to drive the rear foot pedal into the snow. A brake lever acts on a push rod connected to the piston in a master cylinder fitted with a brake fluid reservoir, transmitting force through a hydraulic brake fluid line to a pair of pistons, connected by a tee, which then push the foot pedal into the snow.

The snowboard makes full contact with the snow substantially along its length and width (with a leading edge angled upwardly as on skis and snowboards), so that it is used in the same manner as a snowboard, but allows the user to hold onto the handlebar. The angle the post makes with the snowboard is adjustable, but then secured so that it doesn't change while in use. By combining a snowboard with an upright post having handlebars on which hydraulics are used for braking, one obtains a snowboard scooter providing an unprecedented safe skiing experience.

DETAILED DESCRIPTION OF THE INVENTION

Figure 1:
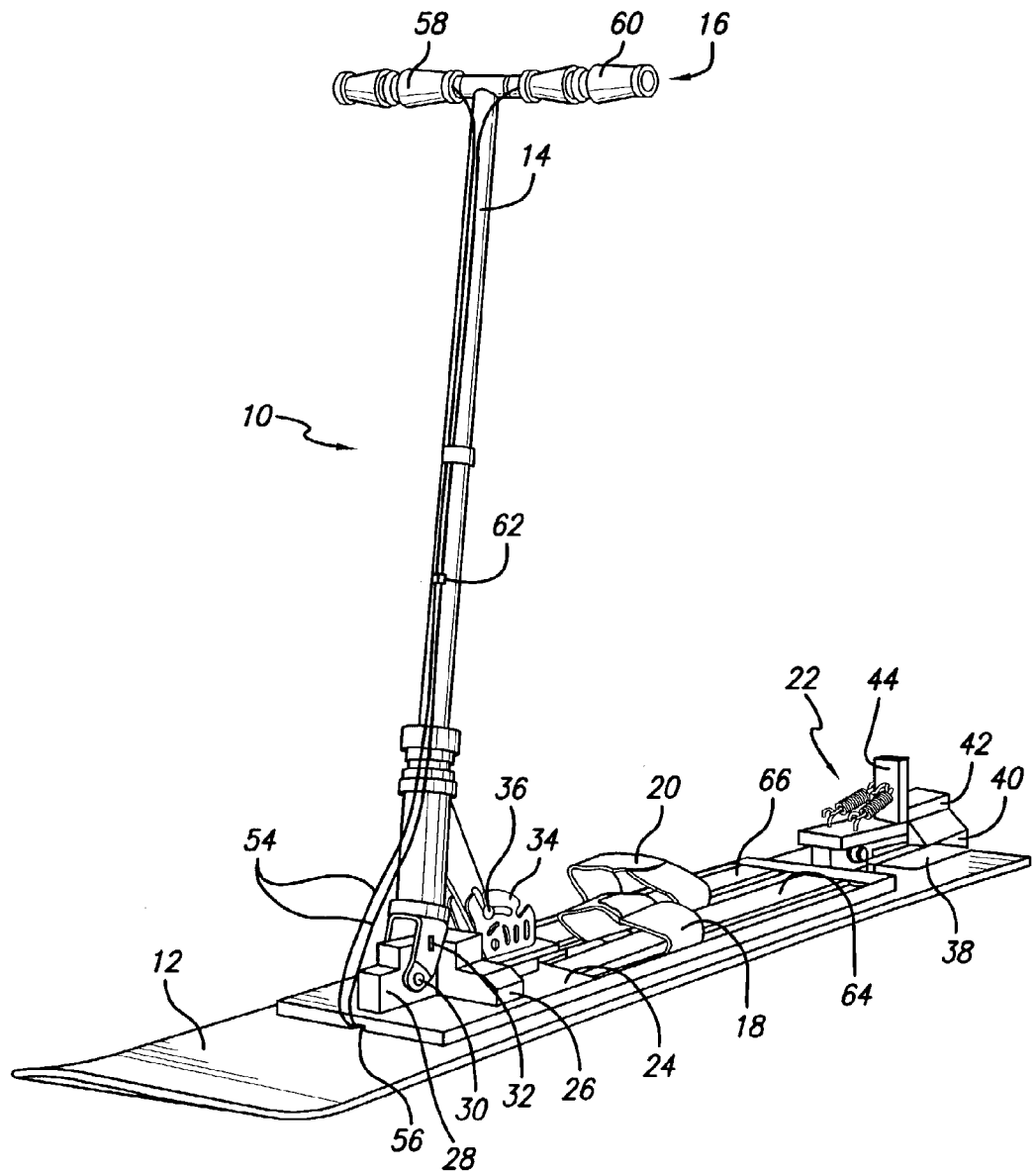
FIG. 1 is a front perspective front view of the snowboard scooter in accordance with one embodiment of the present invention in which cable operated brakes are provided.
Figure 2:
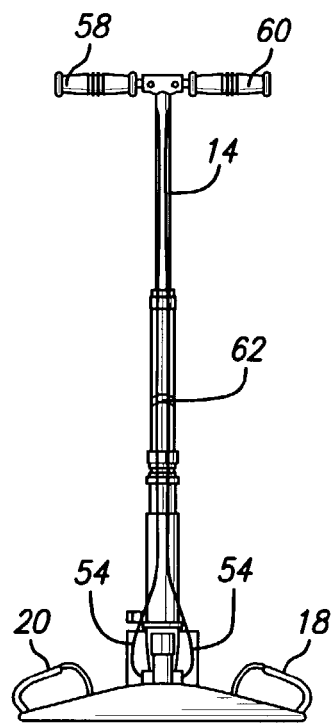
FIG. 2 is a front view of the snowboard scooter.
Figure 3:
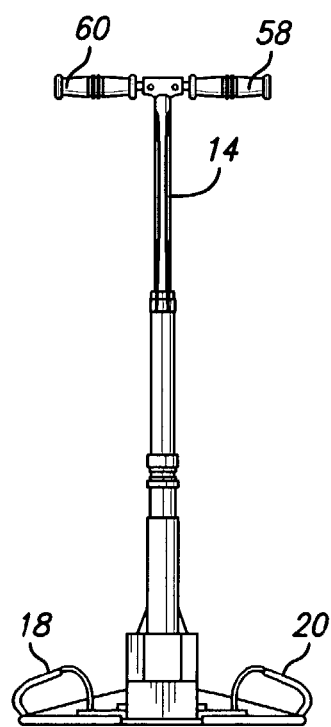
FIG. 3 is a rear view of the snowboard scooter.

Referring first to FIGS. 1-7, in one embodiment of the invention, the snowboard scooter 10 of this invention is built on a snowboard 12 to which is fixed a post 14 carrying a handlebar 16 at its top end. A pair of left and right boot grips in the form of foot straps 18 and 20 are secured to the snowboard 12, and a brake assembly 22 is located at the rear of the snowboard 12.

The snowboard 12 is of commercial construction, i.e., it can be a regular commercially available snowboard formed with a leading edge angled upwardly, modified to be fitted with the post 14 and brake assembly 22. In this embodiment, a platform 24 is preferably provided to secure the post 14 and foot straps 18 and 20 to the top of the snowboard 12, and provides certain advantages as will be described, but in its broader concept, the post 14, and foot straps 18 and 20 can be secured directly to the snowboard. The platform 24 is secured by strong adhesive, and/or by bolts (not shown) to the top surface of the snowboard 12 in such a way that no bolts extend below the bottom surface of the snowboard 12.

The post 14 is secured to the snowboard by means of a bracket assembly 26. The bottom of the post 14 is secured to an upright component 28 of the bracket assembly 26 by a pin 30 through the arms of a shackle 32 so as to pivot on the bracket assembly upright component 28. The post 14 can thereby be pivoted to a position that is comfortable for the user, then secured by means of a slotted bracket 34, carried by the bracket assembly 26, and retaining bolt 36. The post 14 is of telescopic construction. It and the handle bar 16 as well as the bracket assembly 26, including the shackle 32 and slotted bracket 34 and associated components, are all commercially available, and are in commercial use on commercially available roller scooters.

The brake assembly 22 is located on the rear edge of the snowboard 12. A section 38 of the rear edge of the snowboard 12 is cut out to accommodate pivotal movement of a flange 40 into the slow to snow or stop the scooter 10. As detailed in FIGS. 4-7, the flange 40, formed of rigid aluminum, is secured to a foot pedal 42 having an upright 44 retained in its raised position by a pair of springs 46 connected to a retention block 48, and pivotable about the block 48 by a pivot member 50 and pivot pin 52 securing the foot pedal 44 to the block 48. When a user desires to slow or stop the scooter 10, he or she can do so by stepping on the foot pedal 44 with one or the other of his or her feet, to extend the flange into the snow. By this arrangement, the snow scooter 10 can be slowed smoothly and easily, or stopped.

Figure 4:
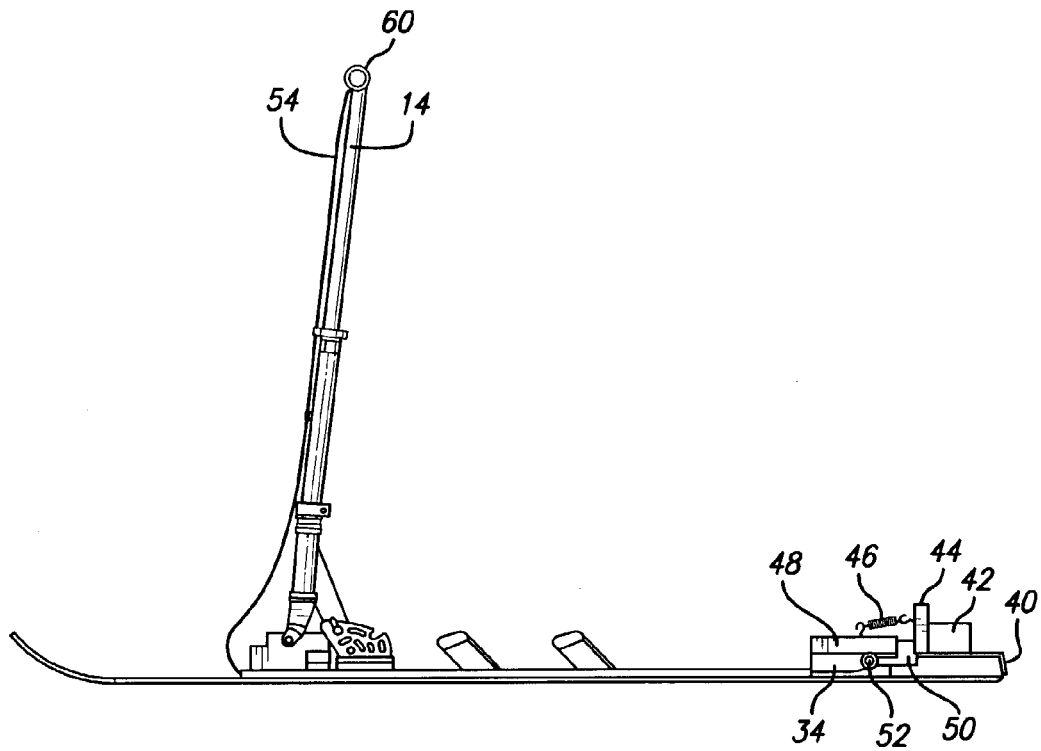
FIG. 4 is an elevational view of the left side of the snowboard scooter.
Figure 5:
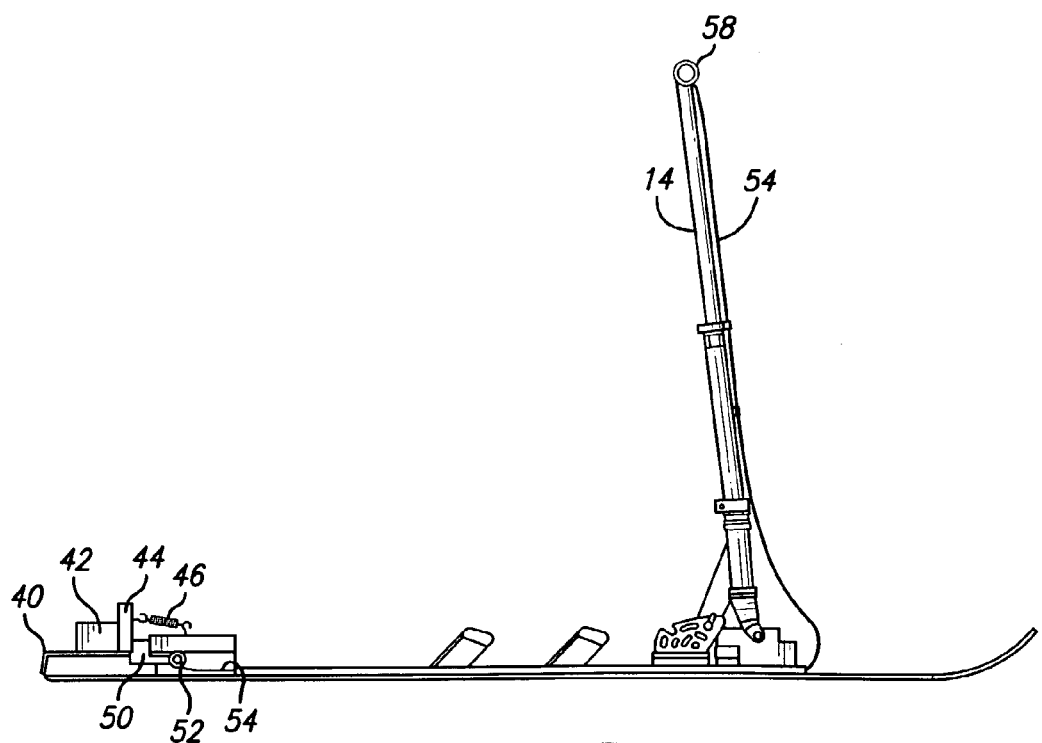
FIG. 5 is an elevational view of the right side the of the snowboard scooter.
Figure 6:
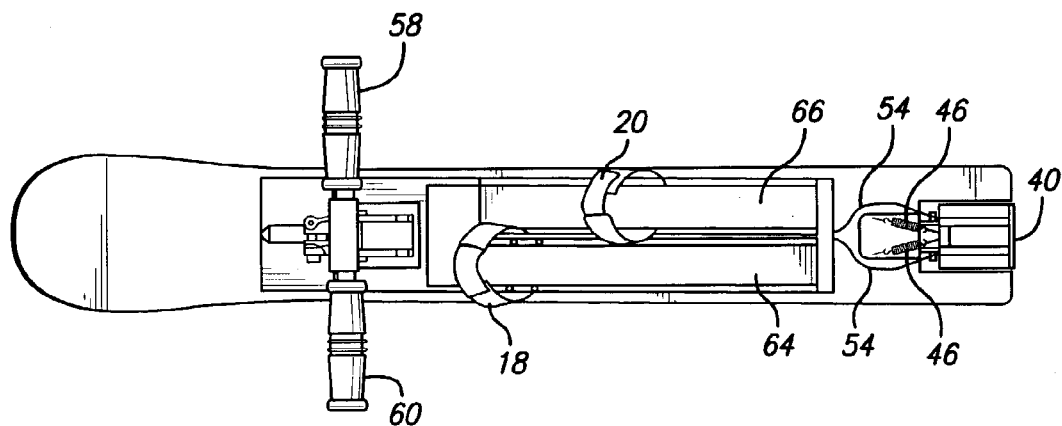
FIG. 6 is a top plan view of the snowboard scooter.
Figure 7:
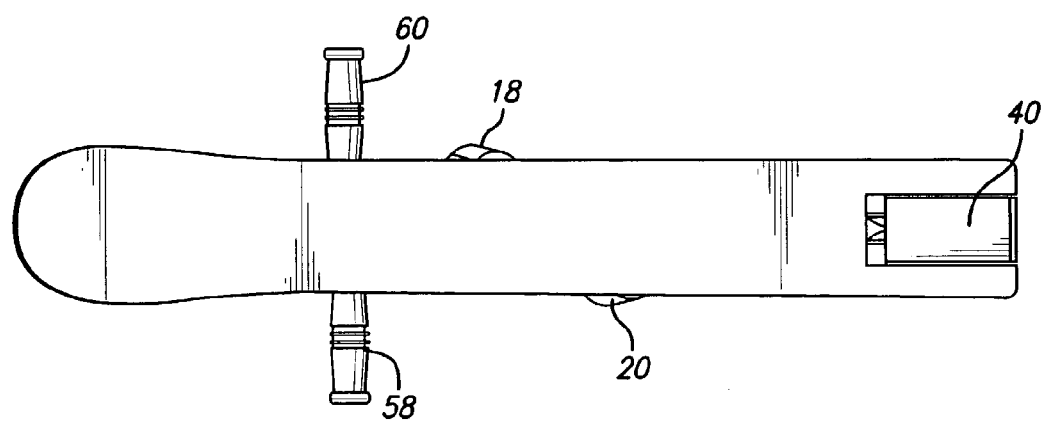
FIG. 7 is a bottom plan view of the snowboard scooter.

Referring again to FIG. 1, and to FIGS. 4 and 5, alternatively, or in addition to the foot pedal 44, the brake assembly can be operated by means of a pair of cables 54 that extend from the handlebar 16, through a channel 56 extending along the bottom surface of the platform 24, to the brake assembly pivot member 50. The handlebar 16 carries opposing grips 58 and 60 which are arranged to rotate freely on the handlebar. The cable 54 is connected to the grips 58 and 60 guided by appropriate eyelets, such as at 62, whereby when the grips are rotated against the force of the brake assembly springs 46, they rotate the brake assembly flange 40 into the snow. By providing both capabilities, the user has available great flexibility in stopping the snowboard. By using the handlebars, and with body "English," the user can use the brakes in part to steer, or to slow down the snowboard without stopping, as the depth of penetration of the brake assembly flange 40 can be better controlled.

The boot grips 18 and 20 can be of leather and fixed as loops to the platform 24, but preferably they are foot straps 18 and 20 formed of hook and loop material such as Velcro to be adjustable. The foot straps 18 and 20 are laterally disposed but offset, i.e., but for the offset, they would be side-by-side. The offset is such that the toe of one foot, preferably the right foot, is secured to be aligned approximately with the instep of the other foot. They are secured by planks 64 and 66 on the platform 24.

By having the brake assembly 22 operated by either the cables 54 or the foot pedal 44, or both, the snowboard scooter user can exert increasing pressure on the brake assembly to progressively slow the scooter 10 or stop it.

Figure 8:
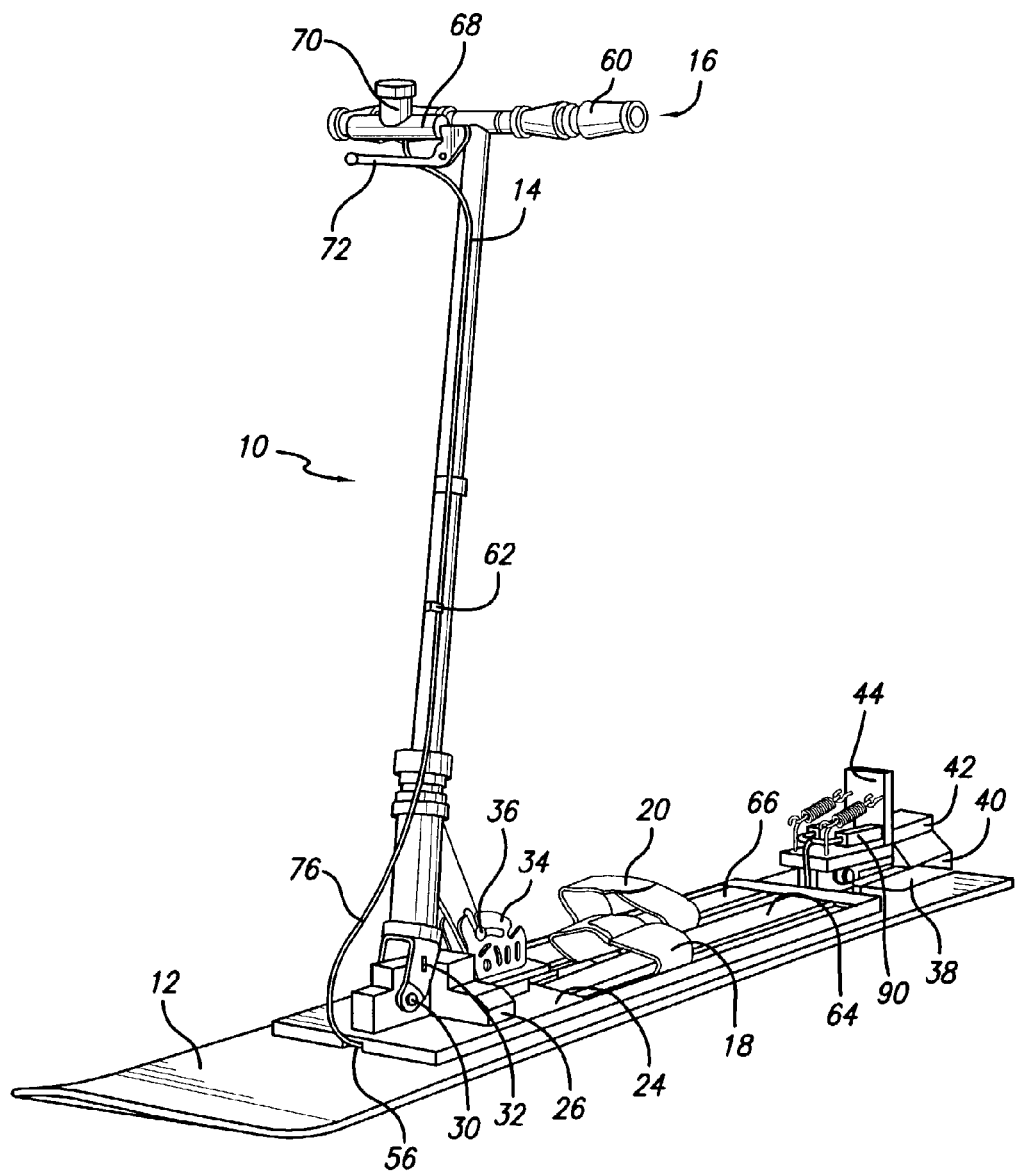
FIG. 8 is a front perspective front view of the snowboard scooter in accordance with a second embodiment of the present invention in which hydraulic brakes are provided.
Figure 9:
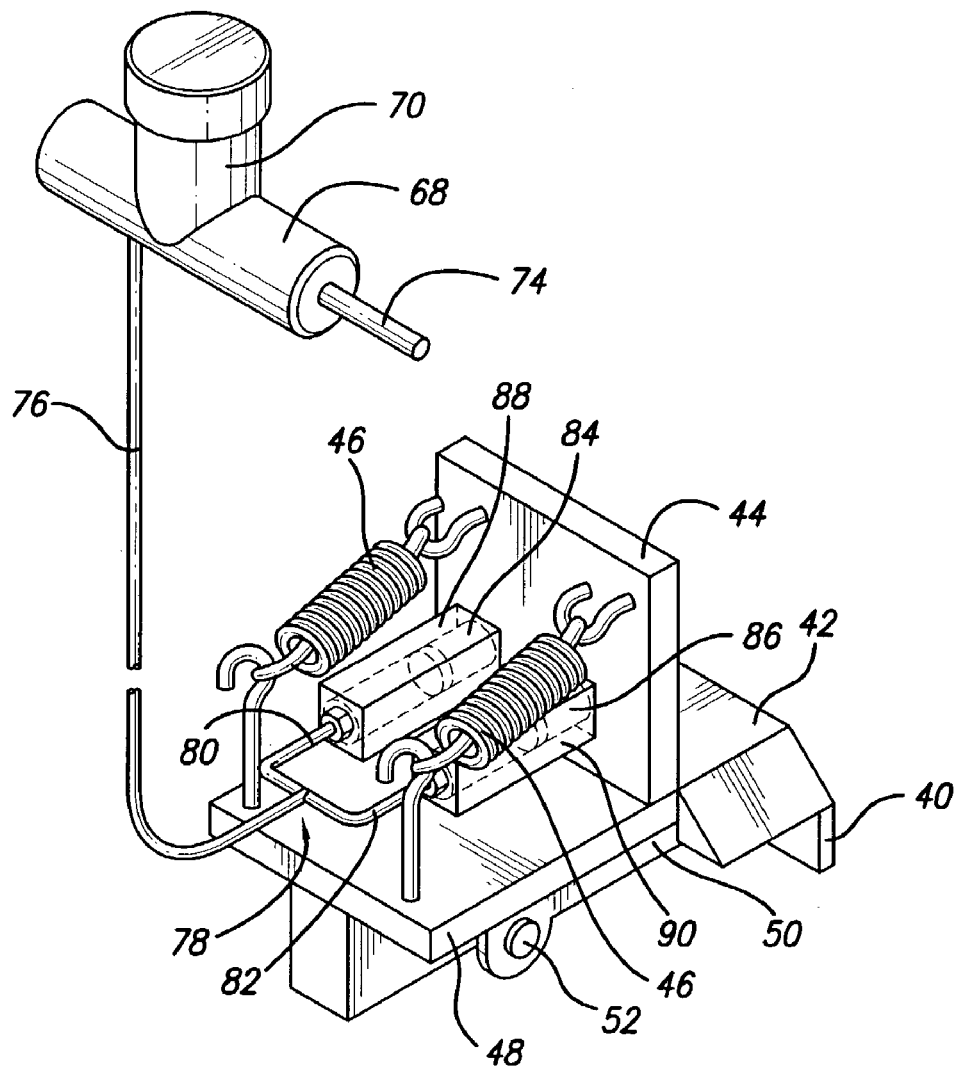
FIG. 9 is schematic view of the operating parts of the hydraulic brake system of FIG. 8.

Referring now to FIGS. 8 and 9, a preferred embodiment of the invention is shown wherein hydraulic brakes are used. The snowboard scooter shown in FIG. 8 is identical to the snowboard scooter of FIG. 1 except for substituting a hydraulic brake system for the cable system of FIG. 1. Therefore, other than with respect to the hydraulic system, the description and lead lines of FIG. 8 is the same as with respect to FIG. 1, mutatis mutandis.

The hydraulic system, shown generally in FIG. 8 and schematically in FIG. 9, uses a master cylinder 68 connected to a brake fluid reservoir 70, to which is connected a brake lever 72 (FIG. 8) that exerts pressure on a push rod 74 (FIG.

9). The master cylinder 68 is formed internally with a piston (not shown) that, in response to movement of the push rod 74 exerts pressure on brake fluid contained in a hydraulic brake fluid line 76. The brake fluid line 76 is formed with a tee 78 at its distal end wherein two brake fluid line branches 80 and 82 communicate with respective pistons 84 and 86 (shown in shadow in FIG. 9) contained in respective piston housings 88 and 90. The pistons 84 and 86 abut the upright 44 so that when the brake lever 72 is squeezed, hydraulic pressure is transmitted via the brake fluid line 76 to the pistons 84 and 86 thereby pushing the upright 44 against the force of the springs 46, moving the brake flange 40 into the snow to brake the snowboard.

Using a hydraulic brake system provides a great degree of safety. The brake system is similar to that found on motorcycles, except that instead of having distal pistons apply pressure to a rotating brake pad, the pistons are applied, preferably split by a tee, to move a braking flange into the snow. The master cylinder and brake lever combination is readily available as it can be the same as commonly used on motorcycles. See for example the brake systems described in U.S. Pat. No. 4,626,038 to Hayashi et al, U.S. Pat. No. 6,338,533 to Wakabayashi et al, U.S. Pat. No. 6,484,855 to Yaple, and U.S. Pat. No. 6,502,675 to Andrus, the disclosures of which are incorporated herein by reference. To applicant's knowledge, use of a hydraulic brake on a snowboard is unprecedented.

The combination of the foregoing features enable a skier to retain the ability to control the snowboard scooter 10 using body English to have the exhilarating excitement of snowboarding with a greater degree of control and safety heretofore not feasible.

The invention claimed is:

1. A snowboard scooter for use on snow, comprising:
   a one-piece platform wide enough to accommodate the width of two feet;
   foot grips that are not entirely side-by-side but are laterally disposed in longitudinally offset predetermined positions on opposite sides of the longitudinal axis of the platform;
   a fixable post extending upwardly from the platform; and
   a handlebar on the post.

2. The snowboard of claim 1 in which the platform is continuous.

3. The snowboard of claim 1 in which the platform is formed with a leading edge angled upwardly.

4. The snowboard of claim 1 including a brake arranged for interacting with snow.

5. The snowboard of claim 4 in which said brake is located on the longitudinal axis of the platform, on the rear edge thereof.

6. The snowboard of claim 4 including means whereby the brake can be actuated at the handlebar.

7. The snowboard of claim 6 including a brake lever at the handlebar and a hydraulic brake system comprising a hydraulic line operationally connecting the brake lever to the brake.

8. The snowboard of claim 7 in which the hydraulic brake system comprises a master cylinder having a push rod driven by the brake lever, the hydraulic line connecting the master cylinder to the brake.

9. The snowboard of claim 8 including at least one piston abutting the brake operationally connected to the hydraulic line at the distal end of the hydraulic line.

10. The snowboard of claim 9 in which the distal end of the hydraulic line is formed with a tee branching to two lines, and wherein there are two pistons abutting the brake operationally connected to the hydraulic line.

11. The snowboard of claim 6 including a cable operationally connecting the handlebar to the brake.

12. The snowboard of claim 7 in which one end of the cable is connected to one of the handlebars, and including means whereby rotation of said one handlebar causes retraction of the cable and whereby retraction of the cable actuates the brake.

13. The snowboard of claim 4 including means whereby the brake can be actuated by direct contact with one of the user's feet.

14. The snowboard of claim 4 including means whereby the brake can be actuated at the handlebar and means whereby the brake can be actuated by direct contact with one of the user's feet.

15. The snowboard scooter of claim 1 in which the offset of the foot grips is such that the toe of one foot of a user is secured to be aligned approximately with the instep of the other foot of the user.

16. The snowboard scooter of claim 15 in which the toe of the right foot of the user is aligned approximately with the instep of the left foot of the user.

17. The snowboard scooter of claim 1 in which each said foot grip is comprised of a pair of releasably connectable straps.

18. The snowboard scooter of claim 17 in which each pair of straps releasably overlap and are connectable by hook and loop structures.

19. The snowboard scooter of claim 1 in which said foot grips are secured by planks to the platform.

20. The snowboard scooter of claim 1 in which said post is telescopically adjustable.

21. The snowboard scooter of claim 1 in which said post is rotationally adjustable and fixable at the position to which it is rotated.

22. The snowboard scooter of claim 21 including a slotted bracket fixed to the platform, said post being secured to the bracket through its slot and fixable therethrough to a predetermined rotational position.

23. A snowboard scooter for use on snow, comprising:
   a one-piece continuous platform wide enough to accommodate the width of two feet and having a leading edge angled upwardly;
   foot grips that are not entirely side-by-side but are laterally disposed in longitudinally offset predetermined positions on opposite sides of the longitudinal axis of the platform whereby the toe of one foot of a user is secured to be aligned approximately with the instep of the other foot of the user;
   a telescopically and rotationally adjustable post extending upwardly from the platform and fixable at the position to which it is rotated;
   a handlebar on the post;
   a brake located on the longitudinal axis of the platform, on the rear edge thereof and arranged for interacting with snow; and
   a brake lever at the handlebar and a hydraulic brake system comprising a master cylinder having a push rod driven by the brake lever, and a hydraulic line connecting the master cylinder to the brake whereby to operationally connect the brake lever to the brake, the distal end of the hydraulic line being formed with a tee branching to two lines, and wherein there are two pistons abutting the brake operationally connected to the hydraulic line.

* * * * *